United States Patent [19]

Wood et al.

[11] Patent Number: 4,582,389

[45] Date of Patent: Apr. 15, 1986

[54] HOLOGRAPHIC DEVICE

[75] Inventors: Robert B. Wood, Hillsboro, Oreg.; Robert F. Cannata, Torrance, Calif.

[73] Assignee: Flight Dynamics, Inc., Hillsboro, Oreg.

[21] Appl. No.: 349,924

[22] Filed: Feb. 18, 1982

[51] Int. Cl.[4] .................. G03H 1/04; G02B 27/10
[52] U.S. Cl. .................... 350/3.69; 350/172; 350/174
[58] Field of Search ............ 350/3.65, 3.7, 3.72, 350/171, 172, 174

[56] References Cited

U.S. PATENT DOCUMENTS

| | | | |
|---|---|---|---|
| 3,940,204 | 2/1976 | Withrington | 350/3.5 |
| 4,261,647 | 4/1981 | Ellis | 350/174 |
| 4,407,564 | 10/1983 | Ellis | 350/174 |
| 4,412,719 | 11/1983 | Fienup | 350/3.7 |
| 4,456,328 | 6/1984 | Arns et al. | 350/3.6 |
| 4,458,977 | 7/1984 | Arns et al. | 350/3.6 |
| 4,458,978 | 7/1984 | Arns et al. | 350/3.67 |
| 4,530,564 | 7/1985 | Close | 350/3.69 |

OTHER PUBLICATIONS

D. H. Close, "Optically Recorded Holographic Optical Elements," *Handbook of Optical Holography*, 1979, pp. 573-585.
D. H. Close, "Holographic Optical Elements," *Optical Engineering*, vol. 14, No. 5, Sep.-Oct. 1975, pp. 408-419.
R. C. Fairchild and J. R. Fienup, "Computer-Originated Hologram Lenses," *SPIE Recent Advances in Holography*, vol. 215, 1980, pp. 2-14.
Chungte W. Chen, "Using a Conventional Optical Design Program to Design Holographic Optical Elements," *SPIE Recent Advances in Holography*, vol. 215, 1980, pp. 15-23.
B. J. Chang, "Dichromated Gelatin Holograms and Their Applications," *Optical Engineering*, vol. 19, No. 5, Sep./Oct. 1980, pp. 642-648.
W. S. Colburn and B. J. Chang, "Holographic Combiners for Head-Up Displays," Final Technical Report, AFAL-TR-77-110, ERIM No. 122400-9-F, Environmental Research Institute of Michigan, 1977, pp. 1-37 and 75-104.
S. Rao and S. V. Pappu, "Holographic Methods for the Fabrication of Various Types of Mirrors," *Rev. Sci. Instrum.*, vol. 51, No. 6, Jun. 1980, pp. 809-813.
Kenneth C. Johnson and Gaylord E. Moss, "Laser Eye Protection," Final Technical Report for Aug. 1977 to Jun. 1979, N62269-77-R-0307, Hughes Aircraft Co., pp. i-vi and 1-1-4-6.
Daniel J. Coleman and Jose Magarinos, "Controlled Shifting of the Spectral Response of Reflection Holograms," *Applied Optics*, vol. 20, No. 15, Aug. 1, 1981, pp. 2600-2601.
M. G. Moharam and T. K. Gaylord, "Rigorous Coupled Wave Analysis of Planar-Grating Diffraction," *J. Opt. Soc. Am.*, vol. 71, No. 7, Jul. 1981, pp. 811-818.

*Primary Examiner*—Bruce Y. Arnold
*Attorney, Agent, or Firm*—Stoel, Rives, Boley, Fraser & Wyse

[57] ABSTRACT

There is disclosed herein a holographic optical element (HOE) which is particularly useful for head up display (HUD) systems and similar systems wherein the holographic element is used in a transmission mode as well as in a reflection mode. The element introduces little or no flare when bright light sources are viewed in transmission. The reduction in flare is accomplished by constructing the holographic element so that the fringe density (or spatial frequency) is low or zero at the surfaces of the hologram which forms the holographic element, or stated differently, the fringes in the hologram are formed parallel or substantially parallel to the surfaces of the hologram so that no fringes or very few fringes intersect the surfaces of the hologram. This is accomplished through control of the construction geometry to appropriately orientate the fringes, and a suitable fringe density is approximately two or fewer line pairs per millimeter for a typical application. The exposure rays from a point source used in constructing the hologram are, for example, perpendicular or substantially perpendicular to the surfaces of the gelatin or other sensitive material from which the hologram is made, or variations in the angle of incidence of the exposure rays are otherwise minimized.

28 Claims, 10 Drawing Figures

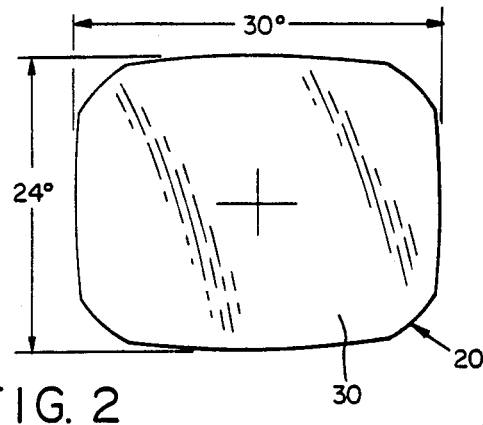
FIG. 2
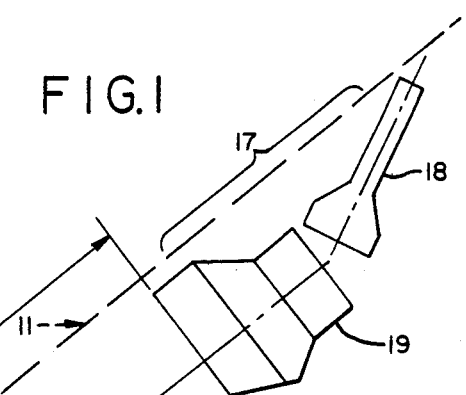
FIG. 1
FIG. 3b
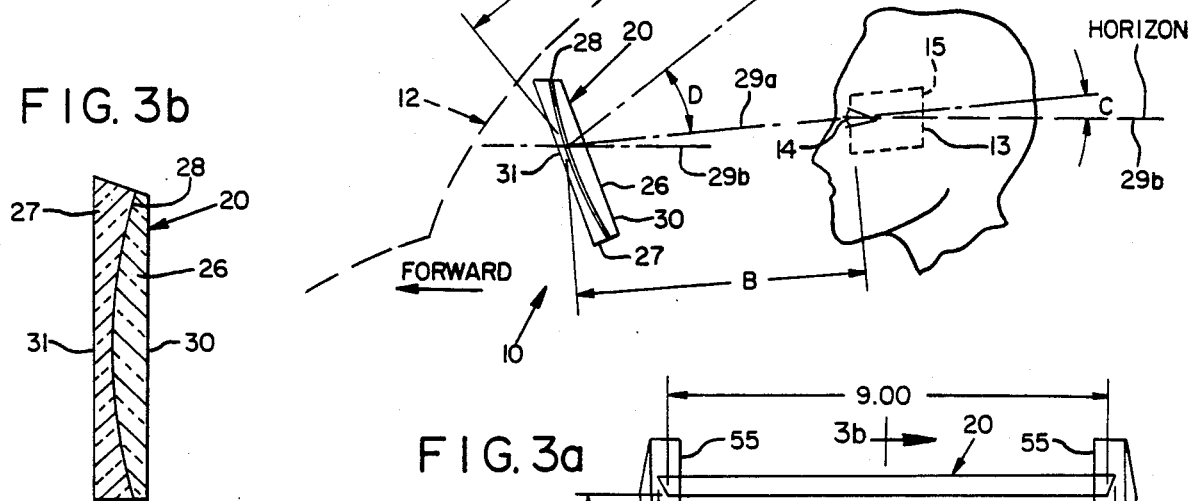
FIG. 3a
FIG. 4a
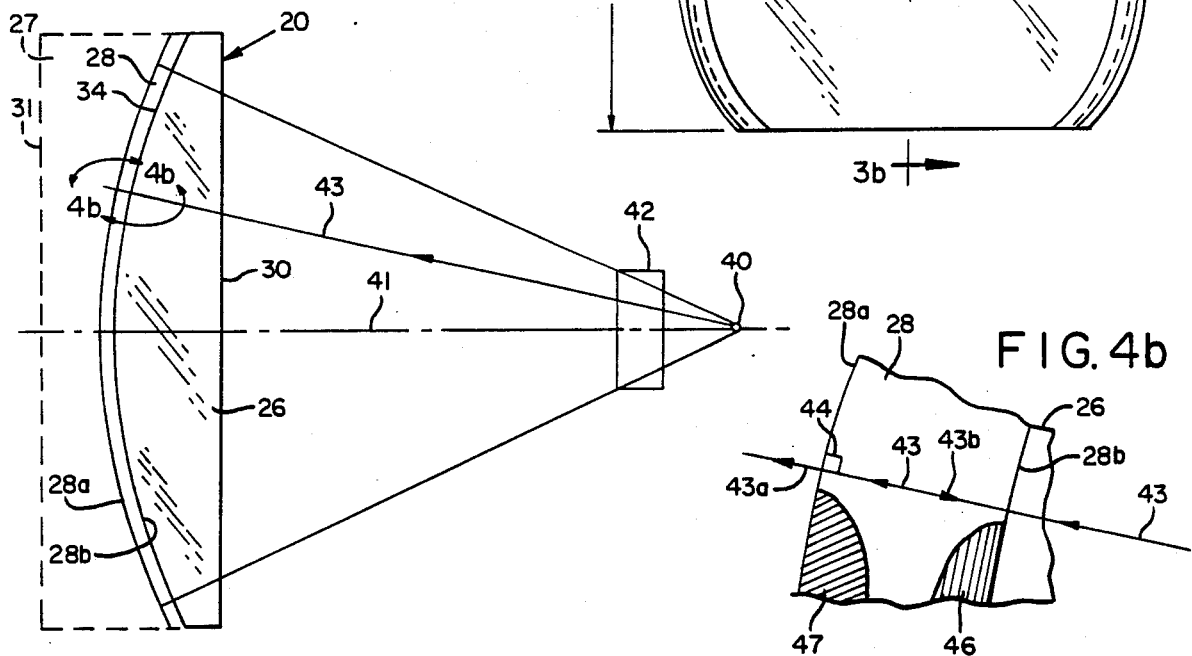
FIG. 4b

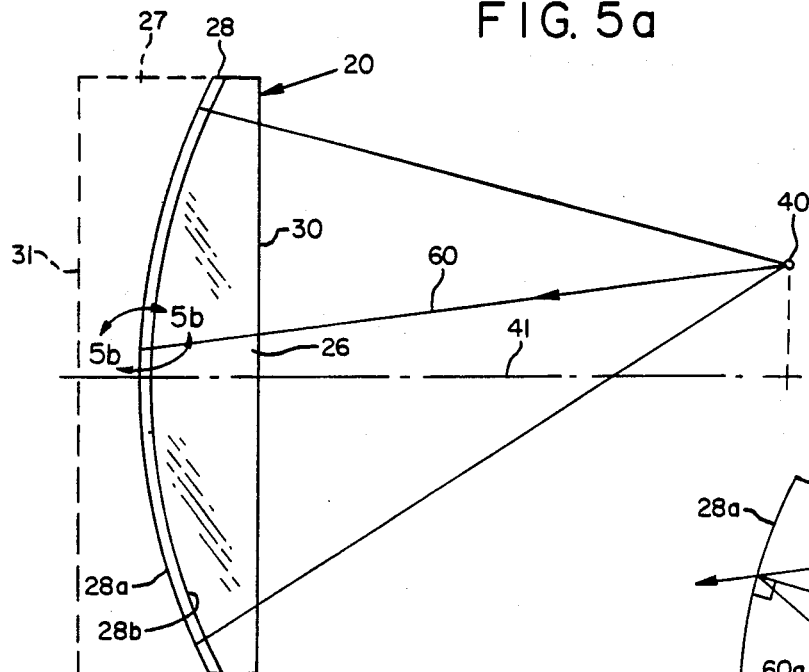
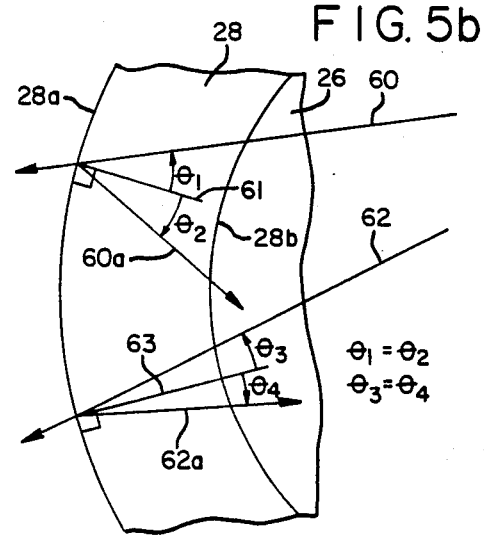
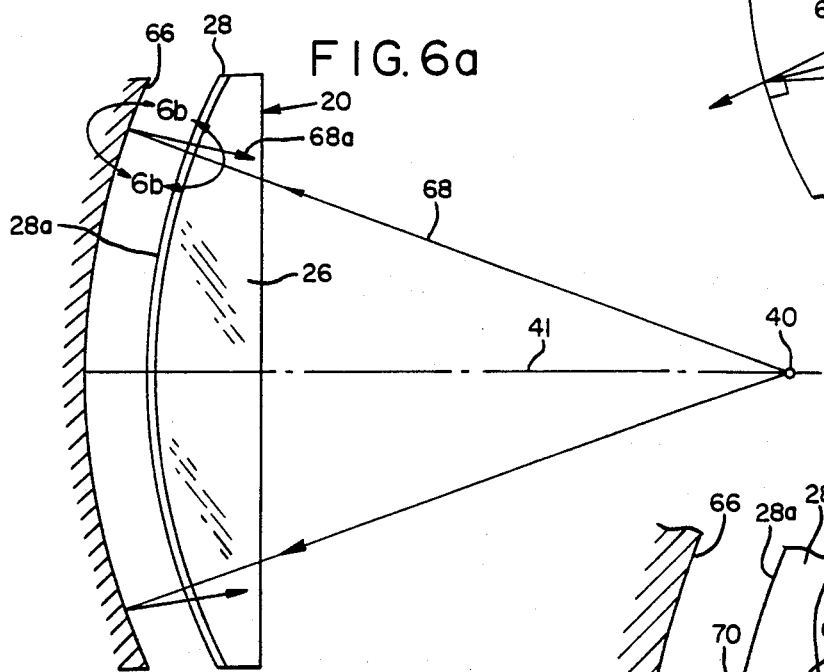
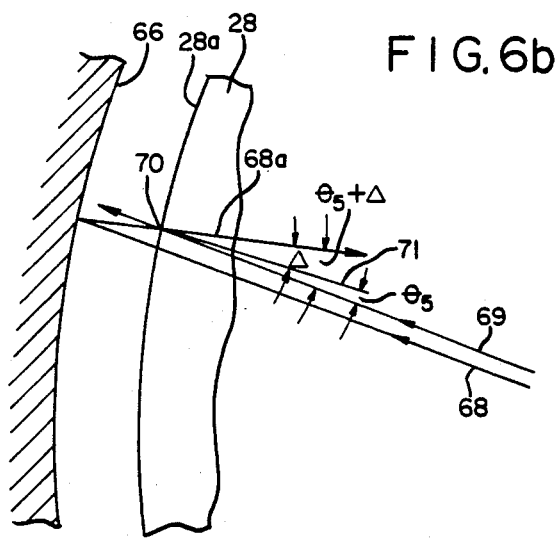

HOLOGRAPHIC DEVICE

BACKGROUND OF THE INVENTION

1. Field of the Invention

The present invention relates to holograms and holographic optical elements and particularly to such elements used in both the transmission and reflection modes such as in head up display systems.

2. Brief Description of Prior Art

Various forms of holograms, holographic optical elements and holographic systems are well known. The subject matter of the present invention is directed primarily to such devices which are used both in the transmission and reflection modes, such as in head up display systems (HUDs) and, thus, such display systems are of interest with respect to the present invention. Head up display systems generally fall into two categories, conventional optics HUDs and holographic optics HUDs. The purpose of both systems is to allow a pilot or other person in the aircraft to see symbolic representations of important flight data while looking through the windshield or canopy of the aircraft at the real world. In the conventional optics system, one or more partially reflecting flat beam combiners (e.g., partially silvered flat mirrors) are placed between the eyes of the pilot and the windshield, and the pilot can look through it at the real world. An image of the data which is of interest to the pilot is projected by a projection system from a source, such as a cathode ray tube, and the image is reflected from the partially silvered mirror to the eyes of the pilot. In this manner, the pilot can see an image of the data superimposed on what he views out the windshield.

In holographic optics head up display systems, a volume hologram or holographic optical element (HOE) is used in place of the partially silvered mirror. The HOE is used essentially as a transmission element for the real world scene, but it also is used as a reflector for the projected images. It superimposes the real world scene, transmitted through the hologram, with the cathode ray tube image and thus is called a combiner. It provides an improvement over the conventional system in several respects. The holographic optical element can provide a larger field of view with greater reflection efficiency than a partially silvered mirror, can be highly color or wavelength selective while causing little attenuation to transmission of the other wavelengths, and in particular can have optical power and/or aberration correcting capability and provide a collimated image of the display.

Thus, the reflection properties of the hologram are more favorable than the mirror beamsplitter for obtaining high thruput for both display (reflection of a narrow spectral band) and real world views (transmission of a wide, i.e., white light, spectral band minus the narrow band). The optical power available with the hologram allows a wider display field of view than can be obtained using conventional optics of the same size and image quality.

Examples of holographic head up display systems are found in U.S. Pat. Nos. 3,940,204 and 4,261,647. Other literature of interest with respect to holographic optical elements, and the construction and forming thereof are, "Optically Recorded Holographic Optical Elements" by Donald H. Close in Section 10.8 of the Handbook of Optical Holography, Copyright 1979 by Academic Press, Inc.; and articles entitled "Holographic Optical Elements" by D. H. Close, pages 408–419 of Optical Engineering, Volume 14, No. 5, September-October, 1975, "Computer-Originated Hologram Lenses" by R. C. Fairchild and J. R. Fienup, pages 2–14 of SPIE, Volume 215 Recent Advances in Holography (1980), "Using a Conventional Optical Design Program to Design Holographic Optical Elements" by C. W. Chen from pages 15–23 of SPIE, Volume 215 Recent Advances in Holography (1980), "Dichromated Gelatin Holograms and Their Applications" by B. J. Chang, pages 642–648 of Optical Engineering, Volume 19, No. 5, September-October, 1980. The foregoing material provides background information with respect to holographic head up display systems, as well as the manner in which holographic optical elements are constructed and formed, materials used, and processing techniques and the like. As is known, holograms contain fringes, and these fringes normally are parallel to the surfaces for a purely reflective hologram and normally are normal to the surfaces for a purely transmissive hologram.

The aforementioned patents disclose head up display systems using a combiner in the form of one or more holographic optical elements, a projector unit including a generally planar narrow waveband light emitting display surface, such as a cathode ray tube screen, and a suitable relay optical system. The narrow waveband light, such as green light (e.g., having a twenty nanometer bandwidth), from the display screen is transmitted by the optical system to the combiner from which it is reflected to the eyes of the pilot. The image of the display is collimated by virtue of the characteristics of the relay lens and holographic lens, and the holographic lens also transmits the real world scene to the pilot without significant light attenuation.

While holographic optical elements have been used in head up display systems for a number of years, there has existed a persistent problem with many such systems. This problem is one of flare, or spurious or multiple images, that the pilot sees as a result of viewing bright light sources through the holographic element or combiner. This is obviously distracting to the pilot of the aircraft. This problem exists where there is transmission of light through, and reflection of images off of, a high thruput efficiency hologram.

SUMMARY OF THE INVENTION

It has been found that the flare and multiple image problem results from particular orientations of the fringes in the hologram and, more particularly, is a result of too many of these fringes intersecting the front and back surfaces of the hologram. Stated differently, the higher fringe densities, or higher spatial frequencies intersecting either surface of the hologram, are the cause of the flare and multiple image problem. The fringes intersecting the surfaces of the hologram break up white light passing through the hologram by diffraction thereby resulting in flare. The diffraction occurs because the light is incident upon a periodic structure (i.e., a grating) which would normally comprise a series of surfaces which vary periodically with index of refraction (iso-index surfaces, referred to as "fringes" herein). The direction and amplitude of the diffracted light is dependent upon the density and orientation of the iso-index surfaces of the diffraction medium as well as the wavelengths and incident angles involved. Flare from a bright point source viewed in transmission is a result of the fringes intersecting either of the hologram surfaces, and multiple images are believed to result from the parasitic transmission lenses formed as a result of the fringes in the main hologram. Flare is a microscopic effect, while the multiple images are the overall effect.

The aberration of real world objects observed through the combiner is variously referred to as flare or as multiple imaging. Either term can be appropriate depending on the type of object being viewed in the real world. If a bright point source is viewed, the appearance of flare around the object is perceived. This is a function of the local surface spatial frequency in the line of sight of the object. However, if a bright extended object is viewed, multiple images appear around the object. Here the angular extent of the object can cover a considerable portion of the combiner. In general, the surface spatial frequency varies smoothly over the combiner area, having a lens-like effect producing multiple images of the real world object. The behavior of flare and multiple imaging will be referred to simply as flare since both effects arise from the same source and, accordingly, the term "flare" is used herein to encompass flare and/or multiple imaging.

The desired action of the holographic combiner is to efficiently re-image, over a narrow wavelength band, the display symbols at infinity while providing an unhindered "window-like" view of the real world in white light. From an optics standpoint, the holographic combiner is an optical element which functions by simultaneously diffracting some wavelengths of light incident upon it while transmitting others.

The present invention involves an apparatus and method for controlling the construction geometry of the hologram so that the fringes therein are substantially parallel to the surfaces, even where the hologram is curved. Thus, in accordance with the present invention, a hologram or holographic optical element (HOE) is constructed in a manner so as to reduce the surface spatial frequency of the hologram to substantially zero everywhere in the visible clear aperture of the HOE by substantially reducing or eliminating the fringe density at the surfaces of the hologram; that is, reducing or eliminating intersections of fringes with the surfaces of the hologram. While it is desirable to have no fringes intersect the surfaces of the hologram, it has been found in a typical HUD that no detectable flare by the human eye exists where the spatial frequency of the fringes is two or fewer line pairs per millimeter (that is, two pairs of fringes intersecting the surface of the hologram per millimeter along that surface).

The surface spatial frequency can be substantially reduced by controlling the angular relationship of the exposure rays with respect to the gelatin surfaces, and in a particular specialized case or embodiment by maintaining the exposure beam from a point source perpendicular or substantially perpendicular to the surfaces of the gelatin or other sensitized material used in construction of the hologram. The present method is particularly useful for curved holograms, such as spherical, which are desirable in providing collimated light in a head up display system. The method in its broadest aspect involves minimizing the variation in the angle of incidence of the exposure beam with respect to the gelatin, and this aspect of the invention will be discussed in more detail later after a full discussion of the specialized case wherein the rays are maintained perpendicular or substantially so. The method of the present invention results in a hologram wherein the fringes are parallel or substantially parallel to the surfaces of the hologram as distinguished from any substantial number of fringes intersecting the surfaces of the hologram. Additionally, the interface between the second, or back, surface of the gelatin and adjoining air preferably is used as the reflector in constructing the hologram rather than using a separate reflector behind the back surface (to serve as the second beam used in construction). This aids in reducing the interference between adjacent exposure rays and thus aids in reducing the spatial frequency.

The hologram can be angled-tuned for the color desired in accordance with conventional techniques. That is, if the reconstruction wavelength of interest is 540 nm at a half angle of approximately fifteen degrees, construction can be with a source wavelength of 514.5 nm and angled-tuned to approximately 556 nm on axis (while, of course, maintaining the construction beam perpendicular to the surfaces of the hologram according to an embodiment of the invention). After exposure, the gelatin can be processed in accordance with conventional techniques.

The holographic optical element of the present invention is useful in various applications where a hologram is used both in transmission and reflection modes, but it will be described in the environment of the head up display system which so uses the HOE.

Accordingly, it is an object of the present invention to provide an improved form of hologram.

An additional object is to provide an improved hologram for head up display systems.

Another object of this invention is to provide an improved holographic optical element which is useful in both the transmission and reflective modes and which is characterized by reduced flare when viewing bright objects in transmission.

A further object of this invention is to provide an improved form of construction for holograms.

A further object of this invention is to provide an improved method of constructing holograms.

BRIEF DESCRIPTION OF THE DRAWINGS

These and other objects and features of the present invention will become better understood through a consideration of the following description taken in conjunction with the drawings in which:

FIG. 1 is a diagrammatic view of a head up display system using as a combiner the improved holographic optical element of the present invention;

FIG. 2 is a diagram of the instantaneous field of view of the combiner;

FIG. 3a is an elevational view of the combiner and bracket and FIG. 3b is a cross-sectional view of the combiner;

FIGS. 4a and 4b illustrate the manner in which the holographic optical element according to a preferred embodiment of the present invention is constructed; and FIGS. 5a and 5b and 6a and 6b illustrate alternative manners in which optical elements according to the present invention can be constructed and further aid in understanding the concepts of the present invention.

DESCRIPTION OF THE PREFERRED EMBODIMENT

Turning now to the drawings, FIG. 1 generally illustrates a side view of the optics geometry of a head up display system in the cockpit 10 of an aircraft 11 having a windshield 12. A pilot is shown at 13 with an eye shown at an eye reference point 14 within an eyebox (exit pupil) indicated by dashed lines 15. The eye reference point 14 is a geometrical point in space. As is known, the pilot usually does not maintain his eye at eye reference point 14 because it represents the horizontal center of the exit pupil. If, for example, there is a 2.5 inch eye separation, the left and right eyes are nominally displaced plus or minus 1.25 inches from the point 14.

The head up display system includes a data projection system 17 including a cathode ray tube (CRT) 18 which provides images of data and a relay lens 19 for relaying the images from the CRT to a holographic combiner 20 with a hologram or holographic optical element 28. The images generally comprise symbols representing flight data. The projection system 17 and combiner are mounted in any suitable manner within the cockpit 10 so as to maintain a fixed spacing, and the combiner also preferably is disposed on a bracket so it can be flipped up out of the pilot's line of sight.

As is known in the art, the combiner reflects the images from the CRT to the eyes of the pilot while allowing the pilot to view the real outside world through the combiner 20 and windshield 12. The combiner 20 thus functions in both reflection and transmission modes. It is particularly desirable, as is known, to collimate the light from the CRT so that the images therefrom appear to the pilot to be at infinity, as are the fields of view through the windshield 12. The holographic combiner 20 performs the function of superimposing the real world scene with the CRT image and collimates the latter in combination with a relay lens, as is known. The combiner 20 gets its name because of the above-described combining of the real-world scene and the CRT image. The combiner has to be curved in order to accomplish the collimation and the merging of the images. The head up display system thus far described is similar to that described in the previously identified patents. In the embodiment described herein, the hologram is a section of a sphere, and the substrates 26 and 27 which sandwich the hologram 28 likewise can be curved. However, the combiner preferably has flat outer surfaces 30 and 31 to reduce real world optical distortions which would result if the surfaces were curved (these distortions are referred to as vertical and horizontal line of sight errors and vertical and horizontal parallax errors).

The combiner 20 of the present invention has a low or zero surface spatial frequency substantially over its clear aperture as described earlier, and this is accomplished through the contruction method for the holographic optical element 28 which will be discussed in further detail in connection with FIG. 4. The combiner 20 comprises glass substrates 26 and 27 with the hologram or holographic optical element 28 sandwiched therebetween. In the exemplary embodiment, the glass substrates 26 and 27 have respective flat surfaces 30 and 31 as noted above. The hologram 28 may be formed in any suitable material, such as any of the gelatins typically conventionally used for making holograms, as well as other suitable materials or deposited layers for providing a high efficiency volume hologram having layers of iso-refractive index transparent material with periodic refractive index variations normal to the layers for obtaining the low surface spatial frequency provided according to the present invention.

The relay lens 19 forms an image in the intermediate space between the relay lens 19 and the combiner 20 such that this image is positioned at approximately one focal length (focal length of the hologram 28) away from the combiner 20 to thereby make the CRT images appear to the pilot to be at infinity. Additionally, the relay lens 19 preferably adds aberrations which cancel out aberrations of the hologram 28 in a known manner. FIG. 2 diagrammatically illustrates the active area of the hologram or instantaneous field of view to the pilot from the combiner 20. It will be seen therefrom that this field of view is thirty degrees horizontally and twenty-four degrees vertically.

The vertex of the hologram 28 (at the intersection of axis 29b—29c) of the combiner 20 is a distance A from the relay lens 19, which, in an exemplary system, is 17.500 inches, and the distance from the eye reference point 14 to the hologram 28 at the intersection of axes 29a and 29c is illustrated at B which, in the exemplary embodiment, is 12 inches. The eyebox 15 indicates the typical limits of eye movement by the pilot within a volume generally four and one-half inches side to side horizontally, two and four-tenths vertically and five inches deep along the axes 29a—29b. In FIG. 1 it will be noted that the pilot's line of sight as indicated by line 29a is slightly offset from a horizontal reference line 29b, and a typical angle is seven degrees. Similarly, the axis 29c of the projection system 17 with respect to the combiner 20 is offset by an angle D and a typical angle in a head up display system according to the present invention can be 30.75 degrees. The reason for the relatively large angle is mainly to allow sufficient room for both the pilot and the projection system for a particular cockpit arrangement. It is desirable to use a smaller reconstruction angle so as to minimize off axis aberrations, but small angles present a packaging problem in allowing the pilot to move his head around without obstructing or interfering with the projection system 17, unless a display arrangement as discussed in above-noted U.S. Pat. No. 4,261,647 is used. In accordance with conventional practice, a reflection hologram usually is constructed with two beams, one converging toward a focal area and one diverging from a source arranged such that both the focal area and source are located on the same side of the hologram and such that the angle between the chief ray of each beam is approximately the same angle used in reconstruction and such that the beams travel in approximately opposite directions in the recording medium. In the case illustrated in FIG. 1, the angle D is about 30.75 degrees. However, this will result in substantial flare problems which have been encountered in the past.

Turning now specifically to the exemplary apparatus and method of constructing a hologram having a minimum or low spatial frequency according to the present invention, FIG. 4a illustrates the combiner 20 comprising the gelatin coating 28 on a spherical surface 34 on the front glass substrate 26. The rear glass substrate 27 is indicated by dashed lines in FIG. 4a, but this element is not applied to sandwich the gelatin until after the exposure and processing of the gelatin has been completed to form the hologram and when applied the sandwich is formed in a conventional manner. The front glass element 26 preferably is plano-convex and thus in this case has the flat front surface 30 and a spherical rear surface 34. The gelatin is any one of the many conventional gelatins from which holograms are made, one example of which is made from gelatin powder, USP by J. T. Baker Chemical Co. The gelatin is applied to the spherical surface 34 in any suitable conventional way as by dip coating, film transfer, doctor blading, or any other suitable technique. A typical refractive index of the gelatin is approximately 1.5 to 1.58, and a typical thickness for the gelatin coating 28 from the front surface 28b to back surface 28a is twenty-five microns, although this thickness may vary considerably such as within the range of approximately fifteen to forty microns for visible light systems. A typical material for the glass substrates of elements 26 and 27 is crown glass with the front and rear surfaces 30 and 34 (as well as like surfaces of substrate 27) being optically finished, although plastic substrates can be used.

The substrate 26 with the gelatin coating 28 is placed on an optical bench along with a point source 40 and suitable supporting rails or elements (not shown). The point source 40 is positioned at a location on axis 41 to minimize surface fringes, namely such that the angles of rays therefrom are normal to the surfaces of the gelatin 28. If the front surface 30 of the substrate 26 had the same curvature as the spherical surface 34, then the source 40 would be disposed near the center of the curvature (the exact location of the source depending on the thickness of 26 and its index of refraction as is known) of the gelatin 28 and the rays from the source 40 would strike the surfaces 28b and 28a of the gelatin 28 normal thereto or substantially so. Since the front surface 30 is flat in the exemplary embodiment, the source 40 is positioned closer to the gelatin 28 than its center of curvature because of the refraction of substrate 26.

An optics module 42 may be used if desired. The optics module 42 is particularly useful if the surface 34 is aspheric. The module 42 can be used to aberrate or shape the beam from the source 40 to ensure that the rays therefrom strike the gelatin normal to its surfaces to form the fringes parallel or substantially parallel to the surfaces of the gelatin 28. It has been found with the apparatus and method described above with reference to FIGS. 1 and 4a and wherein the gelatin forming the hologram is spherical, the optics module 42 is not required even though there is some refraction of the beam by substrate 26.

The point source 40, as is conventional, preferably includes a coherent light source such as a suitable laser, focusing lens and aperture stop to form a spatial filter. An exemplary exposure wavelength is 514.5 nm, which can be provided by the green line of an argon laser, for reconstruction in the display system of FIG. 1 at 550 nm. Since the gelatin 28 is spherical, the hologram cannot be constructed with a plane wave source, as is conventional, without creating undesirable fringe geometry in the hologram.

FIG. 4b is an enlarged view and shows one ray 43 from the point source 40 passing through the gelatin layer 28. Much of this ray passes completely through the gelatin 28 as shown at 43a and past the rear surface 28a of the gelatin which also is the gelatin/air interface. However, because of the gelatin/air interface, some of the ray 43 is reflected and returns on itself as indicated by arrow 43b, thus forming the second construction beam. It has been found that there is sufficient reflection (approximately four percent) of the ray 43 from the rear gelatin/air interface 28a to provide proper exposure of the gelatin 28 in the hologram construction process. By maintaining the ray 43 perpendicular to the rear gelatin surface or interface 28a as indicated at 44 in FIG. 4b (and also perpendicular to the front gelatin surface 28b), the fringes formed in the gelatin 28 which thus form the hologram are substantially parallel to the rear surface 28a and front surface 28b of the gelatin. Broken lines 46 diagrammatically illustrate several such fringes near the front surface 28b of the gelatin 28 and parallel thereto, it being understood that similar fringes exist throughout the hologram 28. If the ray 43 does not strike the rear surface 28a of the gelatin 28 substantially perpendicular to that surface 28a, then adjoining rays to ray 43 with the reflected ray 43b interfere and create fringes which intersect the surface 28b as diagrammatically indicated by lines 47 in FIG. 4b. As has been explained, fringes of this latter nature are undesirable. The criteria for substantially zero flare, which is interpreted to mean flare which is relatively undetectable by the human eye or other appropriate sensor, is a spatial frequency (number of fringes intersecting the surface of the hologram per unit length) of approximately two line pairs per millimeter or less for a typical HUD system. Accordingly, the term substantially zero flare as used herein is intended to mean a surface spatial frequency of approximately two line pairs per millimeter or less. The limiting criteria for the variation in angle of incidence 44 which leads to the spatial frequency of approximately two line pairs per millimeter can be expressed mathematically by the following inequality:

$$\cos\Delta\theta \geq 1 - \frac{\lambda}{NT}, \tag{a}$$

where $\Delta\theta$ is the variation of the angle of incidence of exposure light on the gelatin/air interface, N is the index of refraction of the gelatin 28, and T is the thickness of the gelatin 28 layer.

FIGS. 2 and 3 are scale drawings to show the overall field of view and exemplary size (approximately 9 inches by 6.2 inches) and packaging of the combiner 20. FIG. 2 shows the angular field of view to the pilot and FIG. 3 shows the size and packaging. FIG. 3a shows the combiner 20 mounted in an arcuate bracket 55, and FIG. 3b is a cross-sectional view of the combiner 20 taken along a line 3b—3b of FIG. 3a. The bracket 55 allows the combiner 20 to be suitably mounted between the pilot 13 and windshield 12, and allows the combiner to be swung up (like a sun visor) out of the view of the pilot when desired.

FIGS. 5 and 6 are views similar to FIG. 4 but which further illustrate certain of the criteria in constructing substantially flare free holograms according to the present invention. FIG. 5a is substantially identical to FIG. 4a, but shows the point source 40 as being displaced from the axis 41 such that any given exposure ray 60 does not necessarily hit the surfaces 28a and 28b of the gelatin 28 perpendicular or substantially perpendicular thereto. However, it will be seen from FIG. 5b that the exposure ray 60 makes an angle $\theta_1$ with a surface normal 61 and a reflected ray 60a makes an angle $\theta_2$ to the surface normal 61, and $\theta_1 = \theta_2$. Similarly, an exposure ray 62 makes an angle $\theta_3$ with a surface normal 63 and reflected ray 62a makes angle $\theta_4$, with $\theta_3 = \theta_4$.

These particular angular relationships, as will be described more fully below, are to be maintained for all the exposure rays over (or substantially over) the entire useable clear aperture of the hologram. In the exposure method of FIG. 5, the air/gelatin interface at gelatin surface 28a is used as the reflector as indicated in FIG. 5b by the rays 60a and 62a being reflected therefrom.

The construction method of FIG. 6a again is similar to that shown in FIG. 4a, but in this case a separate mirror 66 is used rather than the air/gelatin interface 28a. An exemplary ray 68 from the point source 40 passes through the gelatin 28 and is reflected from the mirror 66 as a reflected ray 68a. The reflected ray 68a is shown in FIG. 6b passing through a point 70 from which extends a surface normal 71, and ray 68a makes an angle $\theta_5 + \Delta$ with the surface normal 71. Another exemplary exposure ray 69 which passes through the point 70 is shown in FIG. 6b and it makes an angle $\theta_5$ with the surface normal 71.

Given the foregoing, several criteria can now be set forth for constructing substantially flare-free holograms according to the present invention. The arrangement shown in FIG. 4 is the specialized case wherein the exposure rays are maintained perpendicular or substantially perpendicular, and FIGS. 5 and 6 illustrate more generalized aspects of the present invention.

Accordingly, reduced flare holographic optical element combiners are characterized by the orientation of the HOE fringe system planes in the gelatin being substantially parallel to both gelatin surfaces. This must occur across the entire useable combiner clear aperture, rather than just over a local area of the combiner. According to the present invention, the following three conditions are made to occur simultaneously in the optical construction method used:

I. The hologram is formed by interference of two coherent wavefronts (from one or more sources). The wavefronts are incident on opposite sides of the substrate/gelatin interface. This is consistent with conventional construction technology.

II. At any point in the combiner aperture during exposure, the angle (e.g. $\theta_1$, of FIG. 5b) between the surface normal (e.g., 61 of FIG. 5b) at that point and the ray (e.g., 60) through that point from the first source (e.g., 40) should be substantially equal to the corresponding angle ($\theta_2$) between the normal (e.g., 61) and the ray (e.g., 60a) through that point from the second wavefront. This condition is fulfilled exactly across the HOE surface for the case where the gelatin/air interface 28a is used to generate the second wavefront by reflection (FIGS. 4 and 5). If the two angles are $\theta_5$ and $\theta_5 + \Delta$ as shown in FIG. 6b, then delta must be $$\Delta \leq \frac{\lambda \cdot 2 \text{ LINES/MM}}{\cos \theta} \quad \text{(b)}$$

where $\lambda$ is the construction wavelength in mm for the surface spatial frequency to be under 2 lines/mm. If $\theta_5$ is zero and $\lambda$ is 514 nm, then $\Delta$ is equal to or less than 1 MRAD.

III. Given the previous conditions, it is the variation of the angle between the surface normal (e.g., 61 of FIG. 5b or 71 of FIG. 6b) and the incident ray (e.g., 60 or 69) which must be minimized across the surface. A conservative estimate on the permissible variation of the angle, $\Delta\theta$, is according to equation (a) given previously. In the present case, the variation is minimized by exposing the gelatin such that light is at a substantially normal incidence as shown in FIG. 4. The variation of the incident angle is less than 5 arc minutes in this case, which is negligible. There may be other applications for which the normal incidence geometry is not optimum, hence it is desirable that the aforesaid angle variation be recognized as the important factor in the generalized aspect of the present invention.

While preferred embodiments of the present invention have been described and illustrated, various modifications will be apparent to those skilled in the art and it is intended to include all such modifications and variations within the scope of the appended claims.

What is claimed is:

1. An optical display system, comprising:
projecting means for projecting images of information to be viewed by an observer;
combiner means for reflecting the images to the observer, the combiner means being disposed to allow the observer to view a scene through it and including a holographic optical element that is sandwiched between first and second transparent substrates and is positioned such that the second substrate is nearer to the observer, the holographic optical element having a curved shape and a surface fringe spatial frequency of approximately two or fewer line pairs per millimeter over its usable clear aperture for reducing flare from bright objects viewed through the combiner means; and
means for mounting the projecting means and the combiner means in a predetermined spatial relationship so that the images which strike the holographic optical element pass through only one of the first and second substrates.

2. The system of claim 1 wherein the system is intended for use by the pilot of an aircraft and wherein the holographic optical element has a spherical shape for collimating light from the projecting means which light is reflected thereby toward the pilot.

3. The system of claim 1 in which the second substrate is the one through which the images pass.

4. A head up display system for aircraft or other vehicle, comprising:
projecting means for projecting images of information for an individual in an aircraft;
combiner means for collimating light rays carrying the images and for only reflecting the images to the individual, the combiner means being disposed to allow the individual to view scenes outside the aircraft through the combiner means and the aircraft windshield, and the combiner means comprising a curved holographic optical element sandwiched between first and second substrates, the holographic optical element having a surface fringe spatial frequency of substantially zero or fewer than two line pairs per millimeter substantially over its usable clear aperture for reducing flare from bright objects viewed through the combiner means; and
means for mounting the projecting means and the combiner means in a predetermined spatial relationship within the aircraft.

5. A method of constructing a hologram, comprising the steps of:
applying a holographic recording material on a transparent substrate; and
exposing the recording material with only first and second coherent wavefronts of light to create interference patterns therein, the first wavefront of light emanating from a light source, passing through the substrate, and striking the recording material at an angle that is substantially perpendicular to its back surface, the back surface comprising an interface between air and the recording material and functioning to develop and reflect the second wavefront of light.

6. A method of constructing a hologram, comprising:
applying on the surface of a transparent substrate a holographic recording material of a first index of refraction;

purposefully forming an interface of a second index of refraction at the substrate noncontacting surface of the recording material; and exposing the recording material, through the substrate, to only a first wavefront and a second wavefront of light to produce an interference pattern of holographic fringe lines in the recording material by the interaction of the first wavefront and a second wavefront of light, the second wavefront being derived from the first wavefront and reflecting back into the recording material as a consequence of the change of index of refraction at the interface.

7. The method of claim 6 in which the first wavefront strikes the substrate at an angle that causes zero or two or fewer line pairs per millimeter of fringes to intersect the surfaces of the resulting hologram, which thereby exhibits over its usable clear aperture imperceptible flare from a beam of bright light that passes through it.

8. The method of claim 6 in which the second index of refraction is that of air.

9. The method of claim 6 in which the first wavefront emanates from a point source.

10. The method of claim 6 in which the substrate surface on which the recording material is applied is curved.

11. A system for constructing a hologram, comprising:

a transparent substrate having a layer of holographic recording material of a first index of refraction applied on a surface thereof;

means to provide an environment of a second index of refraction that forms an interface with the substrate noncontacting surface of the recording material; and means to apply only a first wavefront of light to pass through the substrate and the recording material, thereby to develop only a second wavefront of light that reflects back through the recording material as a consequence of the change of index of refraction at the interface and interferes with the first wavefront to form the hologram.

12. The system of claim 11 in which the substrate surface on which the recording material is applied is curved.

13. The system of claim 12 in which the curved substrate surface is in the shape of a spherical segment.

14. The system of claim 12 in which the substrate has plano-convex surfaces.

15. The system of claim 11 in which the second index of refraction is that of air.

16. The system of claim 11 in which the first wavefront of light emanates from a point source.

17. The system of claim 11 in which the recording material noncontacting surface of the substrate is planar.

18. A method for providing an essentially flare-free head up display for an aircraft or other vehicle, comprising:

providing images of information to be viewed by an observer;

positioning within the observer's line of sight a cruved holographic optical element through which the observer can view an outside world scene, the holographic optical element having zero or two or fewer pairs of fringes per millimeter intersecting the surfaces thereof; and directing light rays carrying the images for reflection by the holographic optical element toward the observer, thereby to enable the observer to view simultaneously an essentially flare-free outside world scene and the images of information.

19. The method of claim 18 which further comprises:

directing the light rays carrying the images through an off-axis angle for reflection by the holographic optical element; and aberrating the images before their reflection to compensate for aberrations resulting from the off-axis angle.

20. The method of claim 18 in which the curved holographic optical element collimates the light rays carrying the images so that the images and the outside world scene appear together to the observer to be at infinity.

21. A method of providing an essentially flare-free head up display for aircraft or other vehicle, comprising:

providing images of information to be viewed by an observer;

positioning within the observer's direct line of sight a curved holographic optical element having surfaces through which the observer can view an outside world scene, the holographic optical element having zero or two or fewer pairs of fringes per millimeter intersecting the surfaces thereof; and directing light rays carrying the images for only reflection by the holographic optical element toward the observer, thereby to allow the observer to view simultaneously an essentially flare-free outside world scene and the images of information.

22. The method of claim 21 in which the curved holographic optical element collimates the light rays carrying the images so that the images and the outside world scene appear together to the observer to be at infinity.

23. The method of claim 21 in which the curved holographic optical element is the only holographic optical element that is positioned within the observer's direct line of sight.

24. The method of claim 21 in which, before the reflection by the holographic optical element, the light rays carrying the images travel within the observer's line of sight only in a direction that is generally away from the observer.

25. An optical display system, comprising:

projecting means for projecting images of information to be viewed by an observer;

combiner means positioned for allowing the observer to view a scene and for receiving through an off-axis angle the images projected by the projecting means, the combiner means including a holographic optical element that is operable in the system for only reflecting the images to the observer and defines a curved viewing surface;

image correcting means positioned between the projecting means and the combiner means to correct for image aberrations resulting from the projection of the images through the off-axis angle to the combiner means; and flare minimizing means in the holographic optical element comprising a pattern of holographic fringe lines of which zero or two or fewer line pairs per millimeter intersect the surface of the holographic optical element to provide essentially zero aberration correction for the image and a substantially flare-free scene to the observer.

26. The system of claim 25 in which the images are carried by light rays emanating from the projecting means, and the curved viewing surface has a radius of curvature such that the holographic optical element collimates the light rays to cause the images to appear to be at infinity.

27. The system of claim 26 in which the holographic optical element is sandwiched between two transparent substrates of which each has a planar surface that does not contact the holographic optical element.

28. The system of claim 25 in which the images are carried by light rays which emanate from the projecting means and reflect off the holographic optical element, and the combiner means is positioned in the observer's direct line of sight such that, before the reflection by the holographic optical element, the light rays carrying the images travel within the observer's line of sight only in a direction that is generally away from the observer.

* * * * *